United States Patent
Buechler et al.

(10) Patent No.: US 6,219,316 B1
(45) Date of Patent: *Apr. 17, 2001

(54) RECORDING OR REPRODUCING DEVICE FOR RECORDING MEDIA HAVING DIFFERENT TRACK SPACINGS

(75) Inventors: Christian Buechler, Villingen-Schwenningen (DE); Lieu-Kim Dang, Feldkirch (AT); Heinz-Joerg Schroeder, Villingen-Schwenningen (DE)

(73) Assignee: Deutsche Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,719

(22) Filed: Mar. 26, 1997

(30) Foreign Application Priority Data

Apr. 17, 1996 (DE) .............................................. 196 14 970

(51) Int. Cl.⁷ .................................................. G11B 7/095
(52) U.S. Cl. ..................................... 369/44.26; 369/44.37; 369/53.2
(58) Field of Search .............................. 369/44.23, 44.26, 369/44.29, 44.35, 54, 58, 111, 44.37

(56) References Cited

U.S. PATENT DOCUMENTS

| | | | |
|---|---|---|---|
| 4,449,215 | | 5/1984 | Reno ..................................... 369/111 |
| 4,686,663 | * | 8/1987 | Kuhn .................................. 369/44.15 |
| 4,737,946 | | 4/1988 | Yamashita et al. . |
| 5,235,583 | * | 8/1993 | Jongenelis et al. ............... 369/44.26 |
| 5,708,636 | * | 1/1998 | Takahashi et al. ................ 369/44.41 |
| 5,815,473 | * | 9/1998 | Takahashi et al. ................ 369/44.26 |
| 5,917,790 | * | 6/1999 | Ohta et al. ......................... 369/44.29 |

FOREIGN PATENT DOCUMENTS 3323007   6/1984 (DE) .

* cited by examiner

Primary Examiner—W. R. Young
(74) Attorney, Agent, or Firm—Joseph S. Tripoli; Paul P. Kiel

(57) ABSTRACT

A recording or reproduction device with a three-point scanning arrangement compatible for use with recording media having different track spacings. The invention makes it possible, without changing the setting of the three-point scanning system, to use recording media having different track spacings. According to the invention, the three-point scanning system is set in such a way that the scanning center points have a lateral spacing from one another which is within a range of a first product, formed by a first predetermined value and the first track spacing, and a second product, formed by a second predetermined value and the second track spacing, the range being less than 8 percent of the value of the first product.

13 Claims, 4 Drawing Sheets

RECORDING OR REPRODUCING DEVICE FOR RECORDING MEDIA HAVING DIFFERENT TRACK SPACINGS

BACKGROUND OF THE INVENTION

1. Field of the Invention

The invention relates to a compatible recording or reproduction device with three-point scanning for recording media having different track spacings.

2. Related Art

Optical and magnetic recording media having different track spacings are generally known. Recording media having a relatively small track spacing mainly belong to a more recent generation and, as a rule, permit the recording or the reproduction of larger volumes of information or data. In order also to be able to continue using recording media of an earlier generation, having a relatively large track spacing, in recording or reproduction devices of a more recent generation for recording media having a relatively small track spacing, these recording or reproduction devices must be compatible with the different recording media. It is desirable, for example, to be able to play CDs, too, in a recording or reproduction device for optical recording media having a high storage density, a so-called SD, which is also referred to as a Super Density disk. Compared with the CD, the SD has a higher storage density, which is achieved, inter alia, by a smaller track spacing. In order to be able to read both an SD and a CD in a recording or reproduction device, a compatible tracking system is therefore necessary. On account of the higher track density or the smaller track spacing in the case of the SD, the tracking of the SD with a generally known three-beam system is more critical than in the case of a CD. In a compatible recording or reproduction device which permits the playback both of a CD and of an SD using the same optical scanning system, it is therefore necessary to set the three-beam tracking in a manner such that it is optimal for the SD. This means that the beams provided for tracking, which are also referred to as the auxiliary beams E and F of the optical system, have to be adjusted in such a way that they are tangent to the SD track on both sides. As a result, the tracking on a CD using the three-beam system becomes more difficult since the auxiliary beams are imaged virtually completely on the CD track, which has a larger width. The amplitude and the phase spacing for tracking become smaller, with the result that the reproduction of a disk having high eccentricity cannot be ensured.

From EP 129 760, it is already known to match the spacing between the beams provided for tracking and the main light spot to the corresponding requirements by rotating the grating with which the auxiliary beams IF are produced. However, this necessitates control means, which require an additional outlay.

SUMMARY OF THE INVENTION

The object of the invention, therefore, is to provide a compatible recording or reproduction device which makes it possible, even without changing the setting of the three-point scanning system, to use recording media having different track spacings in this device.

This object is achieved according to the invention in accordance with the main claims. Advantageous developments are specified in the subclaims.

According to the invention, the three-point scanning system is set in such a way that the scanning centre points have a lateral spacing from one another which is approximately both an integer multiple of one quarter of the track spacings and a common multiple of the different track spacings. Accordingly, the spacing of the scanning centre points for a compatible recording and reproduction device for SD and CD is selected in such a way that it amounts to approximately 7/4 of the track spacing of the recording medium having the smaller track spacing and approximately 3/4 of the track spacing of the recording medium having the larger track spacing. The recording medium having the smaller track spacing is the SD and the recording medium having the larger track spacing is the CD. However, the application of the invention is not restricted to recording media having a spiral data or information track. The data or information tracks of the recording medium may also be parallel tracks. Furthermore, the invention is not restricted to optical recording media such as the SD and CD, but rather can equally be used for recording media in connection with multi-track recording and different track spacings.

BRIEF DESCRIPTION OF THE DRAWINGS

The invention is explained in more detail below with reference to drawings, in which.

DETAILED DESCRIPTION OF THE PREFERRED EMBODIMENTS

Figure 1:
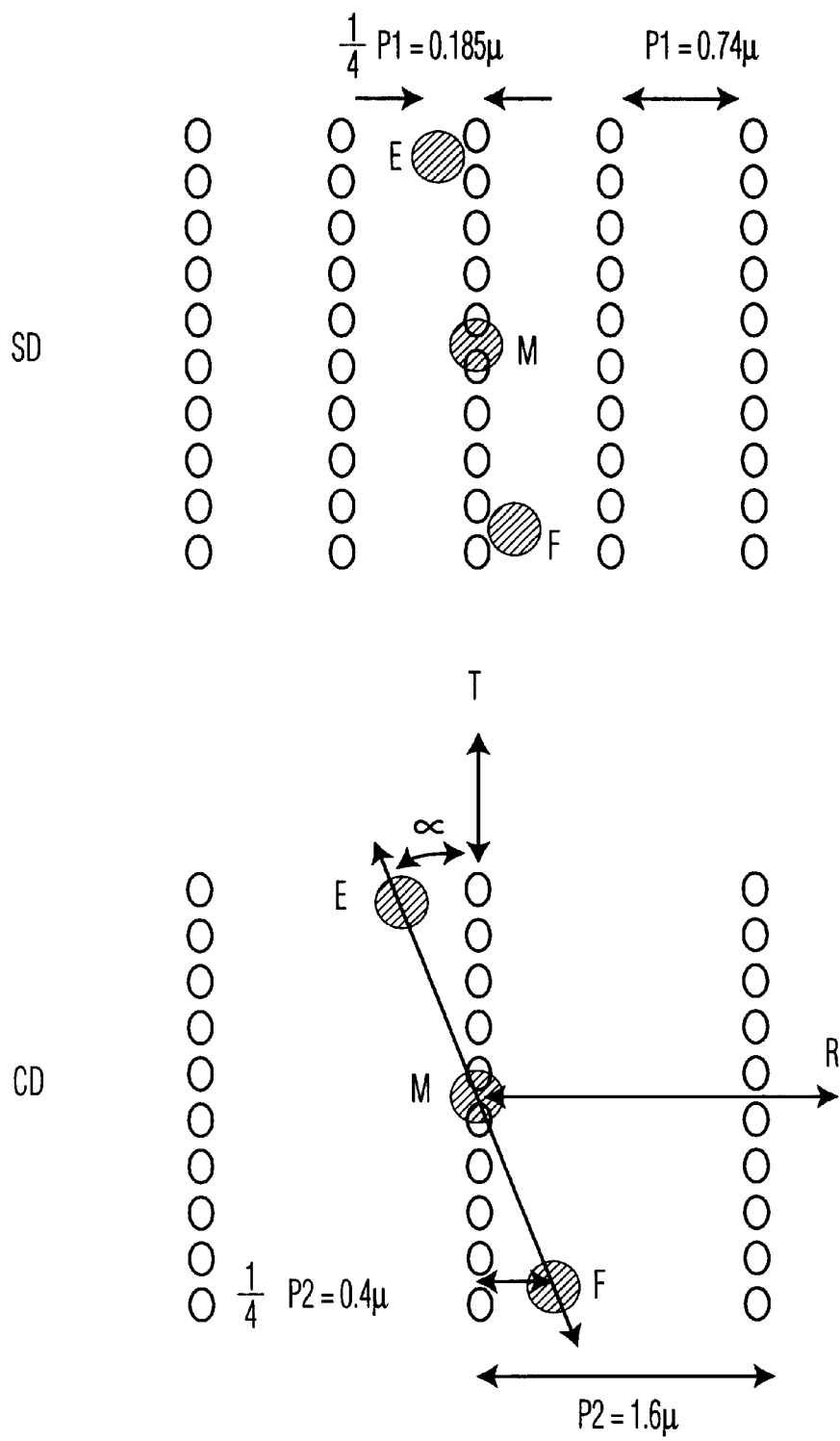
FIG. 1 shows recording media having different track spacings and three-point scanning.
Figure 2:
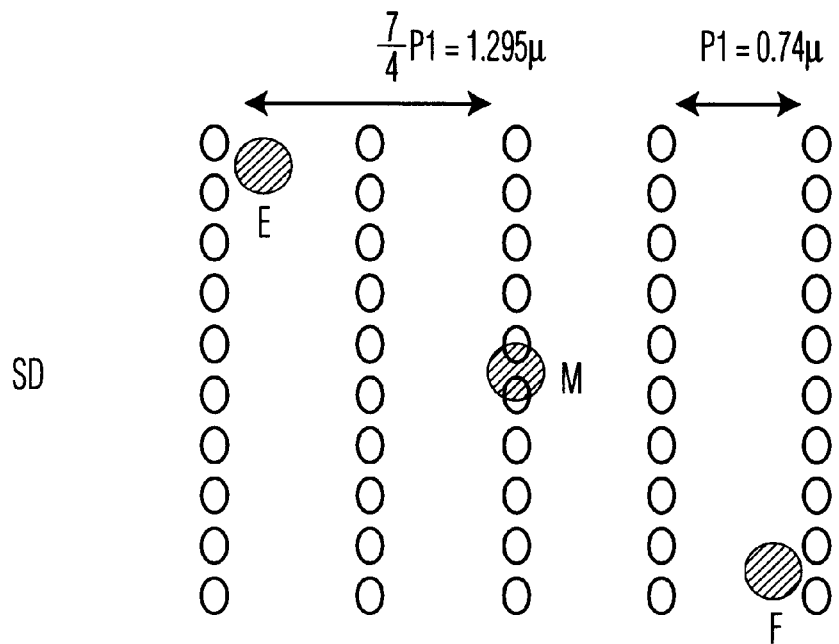
FIG. 2 shows recording media having different track spacings and scanning point arrangement of a compatible recording or reproduction device.
Figure 2:
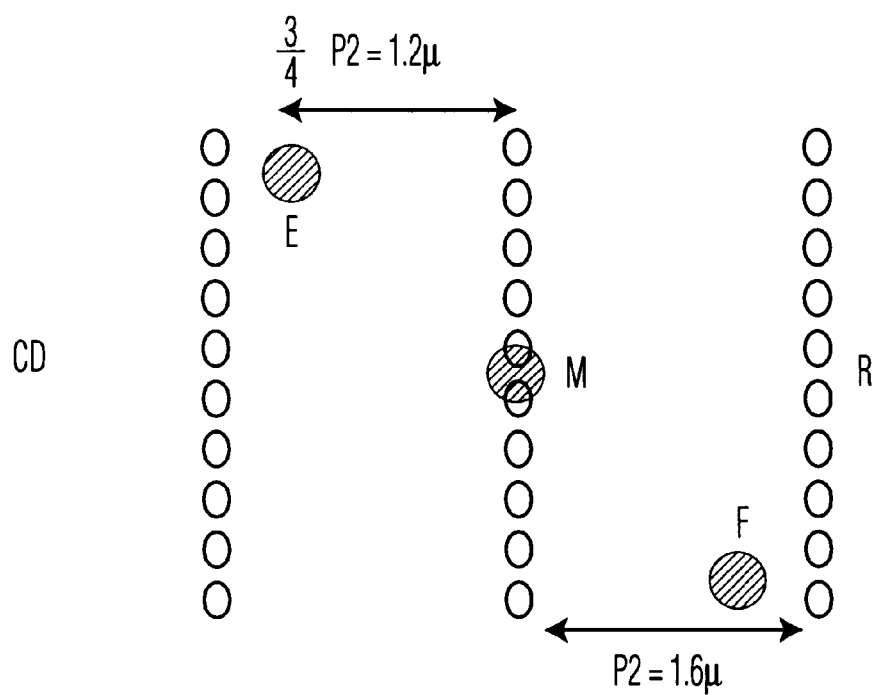
Figure 3:
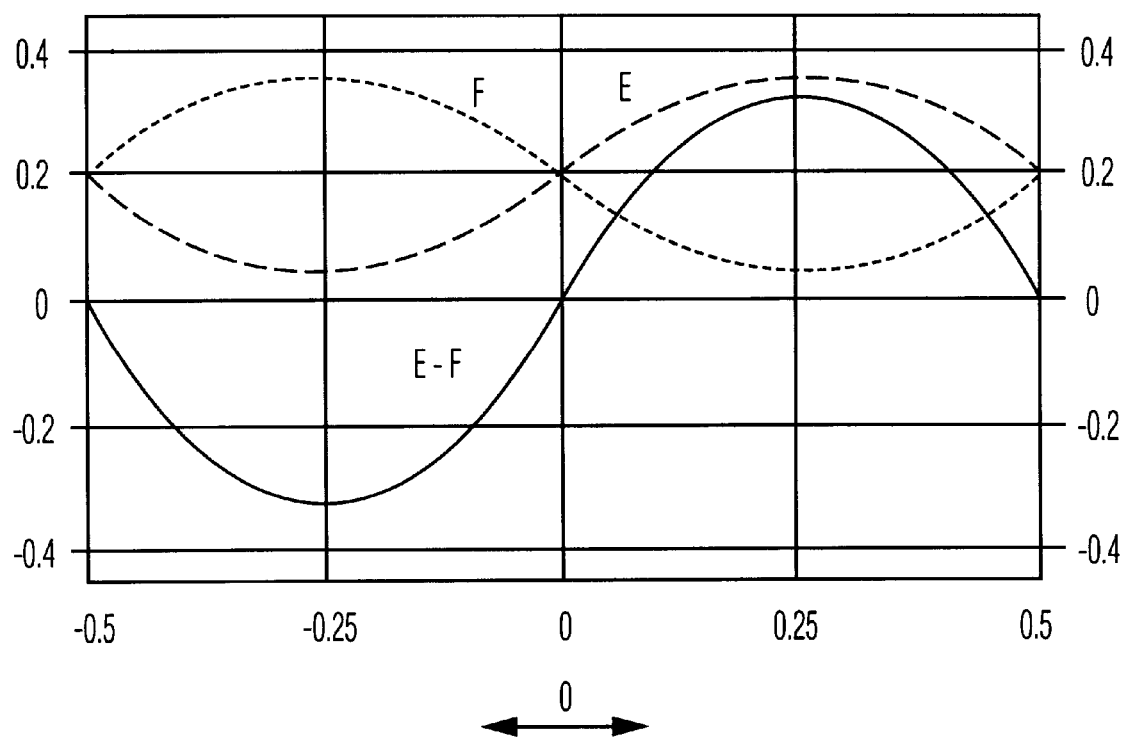
FIG. 3 shows a diagram of the auxiliary beam intensity.

According to FIG. 1, a first recording medium SD has a first track spacing P1 and a second recording medium CD has a track spacing P2. In a first exemplary embodiment, the CD will be a known audio CD having a track spacing P2=1.6 μm. The first recording medium SD has a comparatively smaller track spacing P1 of [0.74 μm. For tracking, use is made of three-point scanning, which is also referred to as three-beam tracking. The three-beam tracking utilises the effect that on average the intensity of the light reflected from the recording medium increases when the light beam follows a path between the tracks. The greatest modulation and smallest average intensity are achieved on a path which follows the exact centre of the track. The light reflected from the recording medium SD, CD has the largest intensity when the light beam is guided on a path exactly between two tracks. A track error signal is derived from the two outer beams, which are also referred to as auxiliary light spots E, F. The auxiliary beams E, F lead and lag the main beam M by the same spacing and are produced by an optical grating. If the centre beam is moved in accordance with the radial direction R indicated in FIG. 1, the auxiliary beams E and F are intended to be adjusted in such a way that when the auxiliary beam E reaches the centre of the track, the other auxiliary beam F is situated in the centre between the tracks. Ideally, the phase shift of the average signal is 180°. Average in this case means that a time constant is used such that the tangential pits are no longer resolved, but it is still possible to detect the intensity modulation on account of the overshooting of the track in the radial direction. Since the track radius is greater for tracks at the outer edge of the disk than for inner tracks, the phase difference between the auxiliary beams E and F fluctuates slightly when a disk is reproduced completely from the inner side to the outer side. The phase difference is greater, the greater the tangential angle α, illustrated in FIG. 1, between a straight line connecting the centre points of the auxiliary beams E, F and the track direction T. Extremely small changes in the phase angle are achieved when the tangential angle α is small. This is the case, in particular, when all three beams touch the same track. The diagram illustrated in FIG. 3 shows the intensity of the signal from the auxiliary beams E and F for the case where the tangential angle α has a value at which the phase shift between the two signals is 180°. The track error signal corresponds to the difference between the signals provided by the auxiliary beams E and F and has a profile similar to a sinusoidal curve. The unit of measurement for the intensity I was selected arbitrarily and track deviations O to the right and left of the track are illustrated as portions of the track spacing on the abscissa axis. It is evident that the difference between the signals formed from the auxiliary beams E, F on account of the phase shift of 180° leads to an error signal having a comparatively larger intensity.

Figure 4:
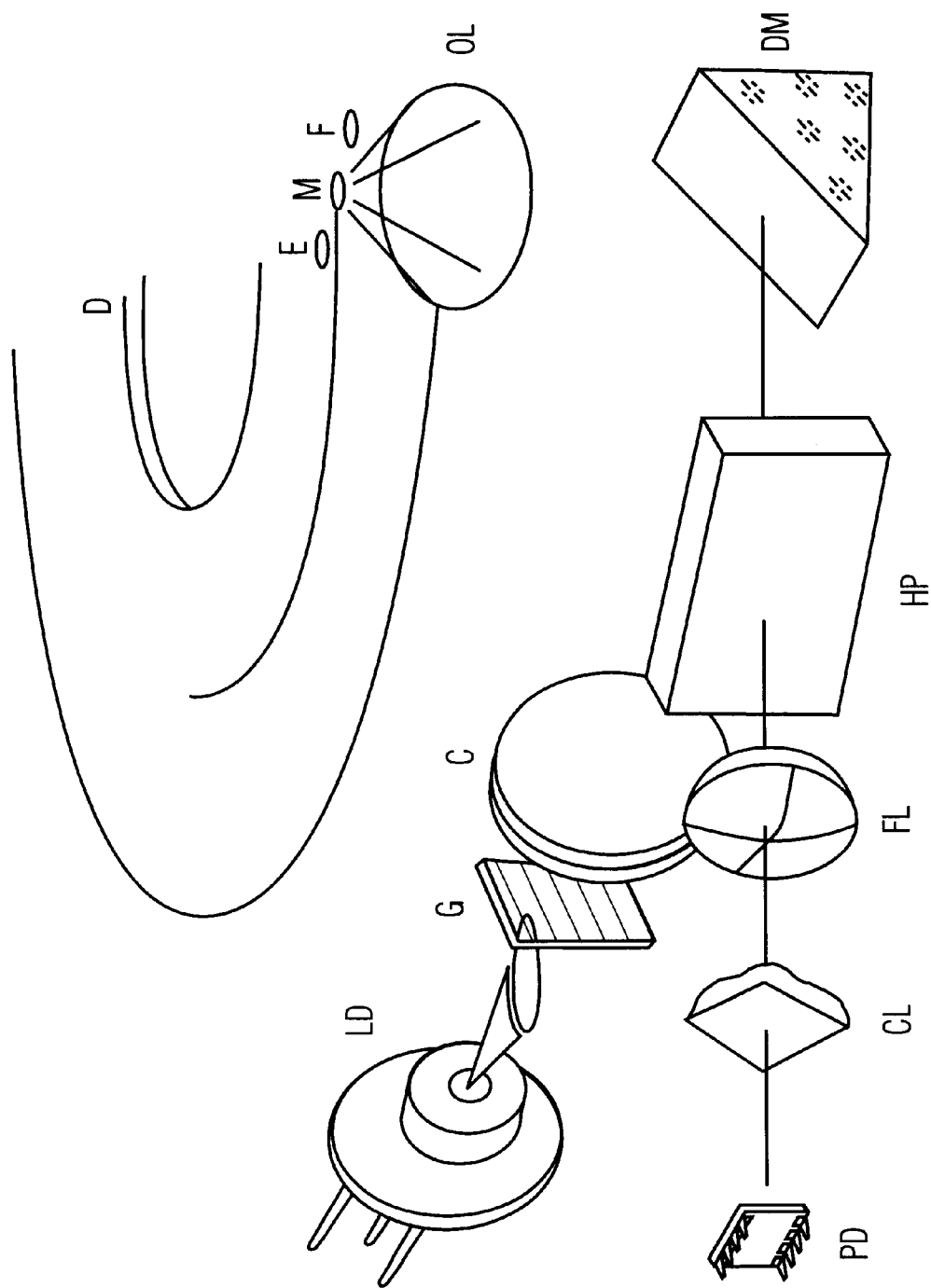
FIG. 4 shows the structure of a compatible recording or reproduction device.

In accordance with this condition, the auxiliary beams E, F for different recording media SD, CD are arranged at a different lateral spacing from one another in FIG. 1. Given a track spacing P1=0.74 μm for an SD, the optimal lateral spacing between the scanning centre points of the auxiliary beams E, F and the central scanning point M amounts to P1/4=0.185 μm. This spacing is equal to the spacing between the scanning centre points of the auxiliary beams E, F and the centre of the track, provided that the central scanning point is situated exactly on the track. In the case of a CD, which has a track spacing P2=1.6 μm, on the other hand, an optimum spacing of the scanning centre points of the auxiliary beams E, F turns out to be P2/4=0.4 μm. On account of the different track spacings P1, P2, a tangential angle a between a straight line connecting the centre points of the auxiliary beams E and F and the track direction T also depends on the type of recording medium CD or SD and the track spacing P1, P2 thereof. In a compatible recording or reproduction device, the structure of which is illustrated diagrammatically in FIG. 4, the grating G producing the auxiliary beams E and F would consequently have to be set in accordance with the respective type of recording medium SD, CD and the track spacings P1, P2. The light spots or scanning beams are formed by the light beam of a laser LD, which is split by the grating G into a central scanning beam and secondary beams +/− of first order. The secondary beams form the auxiliary beams E, F. After the grating G, the light beam composed of the central scanning beam and the auxiliary beams E, F passes through a collimator C and impinges on a semi-transparent mirror, from which it is directed onto a deflection mirror which directs the light beam through an objective lens OL onto the recording medium D. By means of this optical device, the central scanning beam and the auxiliary beams are imaged as scanning points on the recording medium D. The tangential angle α between the track direction and the auxiliary beams E, F is in this case set by means of the grating G. The light reflected from the recording medium likewise passes through the objective lens OL and is directed via the deflection mirror DM, through the semi-transparent mirror HP, a focus lens FL and a cylindrical lens CL, onto a photodetector PD. The scanning points are imaged on the photodetector PD for generating the information signal and for generating focus and track error signals. This means that in the event of a change in the tangential angle α by means of the grating G, the photodetector PD would also have to be correspondingly adjusted anew or additional photoelements would have to be provided. In a compatible recording or reproduction device, however, it appears to be virtually impossible to carry out such settings in accordance with the type of recording medium SD, CD in an automated manner, since the setting must be effected very accurately and with high long-term stability and reproducibility. The alignment of the auxiliary beams E, F at a tangential angle α to the track direction T which corresponds to a mean value or a value between the optimum tangential angles α for the different recording media also does not lead to a track error signal which permits tracking of the recording media having different track spacings P1, P2. On account of the lower tolerances of the SD, it would be necessary to select a tangential angle α which corresponds more to the conditions of the SD. Consequently, the properties of tracking for the CD would considerably deteriorate. For the case where the tangential angle α for the auxiliary beams E and F is set only to half of its optimum valve, the tracking of a CD becomes so poor that it is impossible to play a disk having an eccentricity within the permissible limit values. Despite these conditions, which give the impression that a compatible recording or reproduction device with three-point scanning for recording media having different track spacings is impossible, an arrangement of the scanning points has been found in which, despite different track spacings P1, P2, a track error signal E-F is generated which corresponds virtually to that of an optimum setting of the tangential angle α for the different recording media CD, SD. For this purpose, the scanning centre points of the central scanning point M and of the auxiliary beams E, F are arranged at a lateral spacing from one another which is a common multiple of the track spacings P1, P2 of the different recording media SD, CD. Unfortunately, this case does not occur exactly for a tangential angle α which is as small as possible, but this condition is approximately achieved if the inner side of the next but one track of the SD is used for tracking. This location virtually corresponds to the inner side of the neighbouring track of a CD. Compared with the optimum setting for a CD or SD, however, the track error signal is inverted. However, this can be compensated for by simply interchanging the signals from the auxiliary beams E, F. In practice, the solution is slightly more complex since different substrate thicknesses and different focal lengths for different recording media additionally have to be taken into account. Nevertheless, the solution specified leads to a compatible recording or reproduction device for recording media having different track spacings. In general, it is advantageous if the focal length for the recording medium having the larger track spacing is greater than that for the smaller track spacing.

In order to adjust the three-point system, the scanning points of the auxiliary beams E, F of the scanning system for a recording medium SD having the smallest track spacing are preferably set, in a first method step, in such a way that they have maximum correlation with the central scanning point. In a second method step, the tangential angle α is then increased until the phase shift between the signals formed from auxiliary beams E, F has increased to 2×(360°+180°).

In accordance with a second setting method, the tangential angle α is first of all set for the recording medium CD having the larger track spacing, and fine adjustment for the recording medium SD having the smaller track spacing is then carried out.

In accordance with a third method, in order to set the tangential angle α, use is made of a recording medium SD having the smallest track spacing, but in the case of which only every second track is designed as an information track.

What is claimed is:

1. A scanning device, comprising:

a source of scanning beams for providing a plurality of scanning beams including a center beam and a plurality of auxiliary beams;

means for directing the plurality of scanning beams onto a selected one of a first and second recording medium, the first and second recording media having respective first and second track spacings associated therewith, the first track spacing being more than double the second track spacing, the directing means directing the plurality of scanning beams such that respective scanning center points associated with the scanning beams are arranged on the selected recording medium at a lateral spacing which is within a range formed by a first product, formed by a first predetermined value and the first track spacing, and a second product, formed by a second predetermined value and the second track spacing, the range being less than 8 percent of the value of the first product; and means for generating a tracking error signal in response to the auxiliary beams, but not the center beam, while scanning either one of the first or second recording media.

2. Device according to claim 1, wherein the scanning center points are arranged on the selected recording medium at a lateral spacing which is in a range between 1.2 $\mu$m and 1.295 $\mu$m for scanning recording media having track spacings of 0.74 $\mu$m or 1.6 $\mu$m.

3. Device according to claim 1 wherein the scanning center points are arranged on the selected recording medium at a lateral spacing which is in the range between 7/4 of the first track spacing of the first recording medium and 3/4 of the second track spacing of the second recording medium.

4. Device according to claim 1, wherein the tracks of the first and second recording media are spirals.

5. Device according to claim 1, wherein the tracks of the first and second recording media comprise parallel tracks.

6. Device according to claim 1, wherein a focal length of the scanning device has a ratio which is proportional to the first and second track spacings.

7. A scanning device for scanning first and second recording media having respective first and second track spacing associated therewith, the scanning device comprising:

a source of scanning beams for providing a plurality of scanning beams including a center beam and a plurality of auxiliary beams;

means for directing the plurality of scanning beams onto a selected one of the first and second recording medium, the directing means directing the plurality of scanning beams such that respective scanning center points associated with the scanning beams are arranged on the selected recording medium at a lateral spacing which is within a range formed by a first integer multiple of 1/4 of the first track spacing and a second integer multiple of 1/4 of the second track spacing, the range being less than 8 percent of the value of the first integer multiple of 1/4 of the first track spacing; and means for generating a tracking error signal in response to the auxiliary beams, but not the center beam, while scanning either one of the first or second recording medium.

8. A scanning device for scanning first and second recording media having respective first and second track spacings associated therewith, the scanning device comprising:

a source of scanning beams for providing a plurality of scanning beams including a center beam and a plurality of auxiliary beams;

means for directing the plurality of scanning beams onto a selected one of the first and second recording media, the directing means directing the plurality of scanning beams such that respective scanning center points associated with the scanning beams are arranged on the selected recording medium at a lateral spacing which is within a range formed by a first integer multiple of the first track spacing plus 3/4 of the first track spacing and a second integer multiple of the second track spacing plus 3/4 of the second track spacing, the range being less than 8 percent of the value of the first integer multiple of the first track spacing plus 3/4 of the first track spacing; and means for generating a tracking error signal in response to the auxiliary beams, but not the center beam, while scanning either one of the first or second recording medium.

9. Device according to claim 8, wherein the scanning center points are arranged on the selected recording medium at a lateral spacing which is in a range between 1.2 $\mu$m and 1.295 $\mu$m for scanning recording media having track spacings of 0.74 $\mu$m or 1.6 $\mu$m.

10. Device according to claim 8, wherein the scanning center points are arranged on the selected recording medium at a lateral spacing which is in the range between 7/4 of the first track spacing and 3/4 of the second track spacing.

11. Device according to claim 8, wherein the tracks of the first and second recording media comprise spirals.

12. Device according to claim 8, wherein the tracks of the first and second recording media comprise parallel tracks.

13. Device according to claim 8, wherein a focal length associated with the scanning device corresponds to a ratio which is proportional to one of the first and second track spacings.

* * * * *